May 29, 1928.  1,671,918

A. ZÖBELEIN

CONVEYING DEVICE

Filed April 12, 1926

Inventor
August Zöbelein.

Patented May 29, 1928.

1,671,918

UNITED STATES PATENT OFFICE.

AUGUST ZÖBELEIN, OF NUREMBERG, GERMANY.

CONVEYING DEVICE.

Application filed April 12, 1926, Serial No. 101,557, and in Germany May 11, 1925.

My invention relates broadly to a device for conveying ashes, slag, sand or the like with the aid of water under pressure and more particularly to a construction of apparatus for facilitating the transfer of agglomerate through a pipe line system.

The characteristic feature of the invention resides in the transportation of masses from several different places at which agglomerate material is deposited direct to a storage place by means of a single substantially straight guiding pipe thereby avoiding the usual distributing and collecting pipings with undesirable bends, which are subjected to heavy wearing and cause a loss of pressure.

Not only does the single pipe convey the mixture of agglomerate material with the water as a suspension fluid from any given hopper to the storage place but this single pipe also conveys the water under pressure from the source of power to the hopper being emptied.

In order that the invention may be clearly understood I shall proceed to describe the same with reference to the example of a preferable construction shown in the accompanying drawing; wherein.

Figure 1:
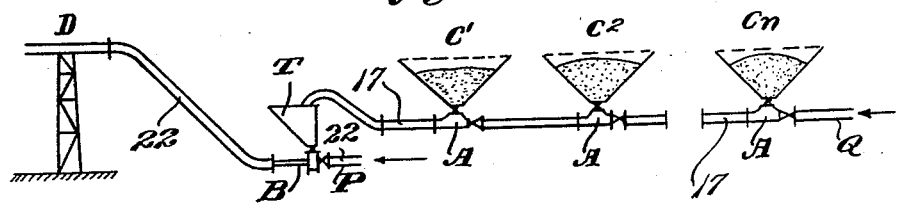
Fig. 1 illustrates diagrammatically in side elevation the arrangement of the conveying device attached to a long distance main conduit.

In Fig. 1 of the annexed drawing the main pipe line 22 is supplied with water under pressure as indicated by the arrow at inlet end P; $C^1$, $C^2$ and $C^n$ indicate the several hoppers where the material to be conveyed is deposited, for example the ash hoppers of boiler furnaces which are filled with the residues of combustion. At the places where the masses are to be carried away the intermediate members A are inserted, the members A being shown more clearly in Figs. 2 and 3. In Fig. 4 reference character B represents the ejector of high output connected to the collecting place T. D is the outlet end of the conveying pipe 22 for conducting the agglomerate material to a storing place.

Figure 2:
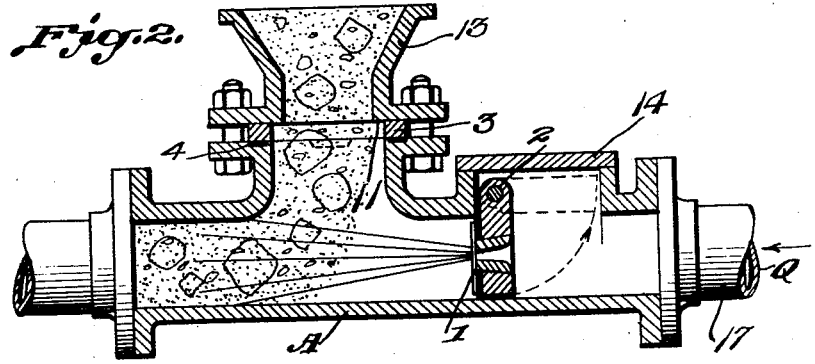
Fig. 2 is a side elevation in longitudinal cross section through the conveying device at one of the places where the material to be conveyed is deposited.
Figure 3:
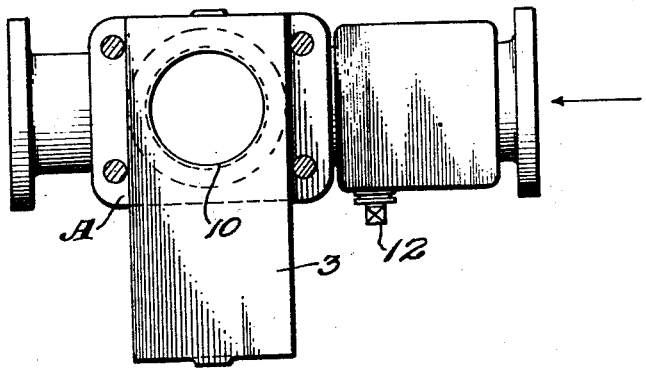
Fig. 3 is a plan view of the conveyor shown in Fig. 2.
Figure 4:
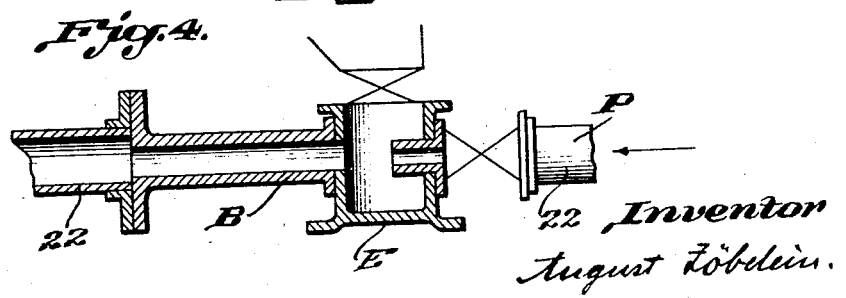
Fig. 4 is a side elevation in longitudinal cross section of the relay ejector for the long distance main conduit.

In Figs. 2 and 3 is illustrated an example of a construction of the nozzle or orifice which is arranged on a member 2 pivotally mounted to swing from a vertical to a horizontal position. The size of the nozzle is carefully selected with respect to water pressure, length of pipe, and so on.

As shown in Figs. 2 and 3, at a point adjacent the nozzle ejector 1 is located a stop valve 3 in the form of a slidable plate apertured at 10 which aperture may be aligned with the aperture 11 in the hopper support 13 by appropriate movement of the stop plate 3. The valve plate 3 during its displacement or after being moved to a position closing the hopper is pressed against an elastic packing 4 permanently protected in a recess of the opposite flange surface of the member or main casting A.

The ejector 1 may be moved into position by turning shaft 12 by means of a wrench while the valve 3 may be closed by horizontally sliding the plate 3, by appropriate valve operating mechanism not shown, under the hopper support 13 to a position wherein the aperture 10 is displaced and the hopper aperture 11 closed. A housing 14 is provided for the nozzle and its supporting plate when the pipe line at this point is cleared for the conveyance of material from a different hopper adjacent some other point in the pipe line. Any one of the nozzles may be moved into position at any one of the hoppers in a battery installation and the valves at all the other hoppers closed and then fluid under pressure admitted to the pipe line for moving the material.

The operation of the present invention is as follows:

Water under pressure is supplied to conveyor pipe 17 as indicated by the arrow in alignment with said pipe at the inlet end Q.

Assuming that the material deposited at the place $C^2$ is to be transported, the nozzle at this place is moved into position by lowering the plate member 2 under control of shaft 12. The slide valve 3 is opened at this particular hopper, while at all other places $C^1$—$C^n$ the nozzles are moved up out of action and the stop valves are closed. The stop valves are arranged in such a manner that in opened position and during the displacement of the stop valves the elastic packing lies permanently protected, so that obstruction of the valve by sand getting between the surfaces is prevented and a tight joint is attained. The agglomerate settles from the hopper and is acted upon by the jet issuing from the nozzle 1 for transporting the material independently of other hoppers.

Since the slide valve 3 under hopper $C^1$ is closed and the nozzle 1 under hopper $C^1$ is swung upward the suspension of agglomerate in water passes under $C^1$ without hindrance. The valves 3 under the plurality of hoppers represented by $C^n$ are likewise closed and the nozzles under the hoppers $C^n$ are swung upward so that the stream of clear water approaching the hopper $C^2$ passes under hoppers $C^n$ without hindrance. Since, as just noted, the valve 3 under $C^2$ is open and the nozzle 1 under $C^2$ is swung down so that the pipe is deliberately obstructed by the nozzle 1, the entire volume of water flowing in the pipe 17 is forced through the opening in said nozzle 1. The more or less gentle flow in pipe 17 is forced from the nozzle with great velocity thereby tearing apart bit by bit the mass of agglomerate which descends through the opening or agglomerate inlet 11. A thorough mixing of the agglomerate with the water ensues so that a suspension is obtained that will readily flow through the pipe to receiver T without clogging.

This use of the conveyor pipe 17 to transmit the water pressure to the nozzle adjacent that particular hopper being emptied has the advantage of avoiding a multiplicity of pipes as is the case where piping separate from the conveyor pipe is used to convey the power transmitting pressure fluid to nozzles adjacent the agglomerate intakes.

Any attempt to use a single unobstructed pipe without the insertion of a jet at the point where agglomerate is being drawn in may result in a complete failure to "draw in" or may result in clogging.

In cases where transportation of the agglomeate to considerable heights and long distances must be effected there is a storage receptacle T provided as shown in Fig. 1. This serves to collect the agglomerate by means of the pipes coming from the several places where the material has its origin. Between this receptacle T and the long distance or main conduit 22 is inserted an ejector E of high output which is supplied at P with water under pressure. Ejector E is provided with a special cylindrical diffusion chamber B. By this arrangement a rugged transportation system of good wearing qualities is provided and the consumption of water and power is reduced.

The diffusion chamber B narrows the passageway in front of the nozzle of ejector E, so that the particles of agglomerate can be actually struck by the jet issuing from the nozzle even though the jet may be quite narrow at this point. This, of course, aids in the mixing and hence in the formation of a good suspension. The diffuser B is made very thick so that it protects the apparatus against undue wear at a point where the agitation of the agglomerate particles is at a maximum.

The invention is not limited in detail to the single modification described above for illustrative purposes, but numerous variations can be made and such variations are intended to be limited only by the scope of what I claim as my invention:

1. A conveying system comprising a pipe line adapted to bear a fluid current, a plurality of hoppers having passages for delivering material to said pipe line, members movable to reduce the cross section of said fluid current and located adjacent each of said hoppers and means for closing the passage between selected ones of said hoppers and said pipe line when a member is moved to reduce the cross section of said fluid current adjacent the passage of a remaining hopper for forcing material through said pipe line.

2. In a conveying system, a pipe line adapted to have a fluid current therein, a plurality of hoppers for delivering material to said pipe line at spaced intervals along the length, an ejector nozzle movable into or out of the fluid current within said pipe line adjacent each of said hoppers and a valve member for closing the passage between selected ones of said hoppers and said pipe line when a selected ejector nozzle adjacent one of the remaining hoppers is moved into the fluid current, said fluid current supplying the nozzle with fluid to form a jet for moving said material through said pipe line.

3. A conveying system comprising a pipe line adapted to bear a fluid current, a plurality of hoppers for delivering material at spaced intervals to said pipe line, a valve member for closing the passage between each hopper and said pipe line, and an independent ejector nozzle adjacent the connection of each hopper with said pipe line, said ejector nozzle being movable from a position out of alignment with said pipe line to a position to concentrate said fluid current into a jet so that the material delivered to the pipe line from the corresponding hopper may be subjected to said jet while the valves connecting all remaining hoppers with said pipe line are closed.

4. A conveyor for agglomerate comprising a pipe line capable of bearing a flow of fluid, a hopper for delivering said agglomerate to said pipe line, a slidable valve for alternately connecting said hopper with said pipe line and disconnecting said hopper from said pipe line, a nozzle plate normally housed out of alignment with said pipe line and arranged to be swung to a position in alignment with said pipe line so that the flow of fluid therethrough will be concentrated to a jet whereby material delivered by said hopper to said pipe line may be subjected to said jet for conveying the agglomerate through said pipe line.

5. In a system for conveying agglomerate comprising a pipe line adapted to convey fluid or the agglomerate mixed with the fluid, a nozzle movable to obstruct the pipe line to concentrate the flow of fluid through the nozzle and a valve to admit agglomerate to said pipe line adjacent said nozzle.

6. In a system for conveying agglomerate through a pipe line, said pipe line adapted to bear a fluid in motion, a plurality of delivery hoppers arranged to deposit agglomerate in said pipe line, a plurality of nozzles adjacent said hoppers and movable into said fluid in motion for converging said flow into a jet, means for cutting off the delivery of said agglomerate from all but a selected one of said hoppers and removing corresponding nozzles from said fluid in motion to permit forcing of the material through said pipe line from a position adjacent said selected one of said hoppers.

7. A conveyor for agglomerate comprising a pipe bearing a current of fluid, hoppers for agglomerate distributed along the pipe, a nozzle adjacent each hopper mounted on a block movable to close substantially said pipe and to constrict the current of fluid to produce a jet to act on agglomerate from a corresponding hopper, said pipe line receiving the agglomerate as acted on by said jet, a second hopper to take the agglomerate from the pipe line, a second jet to act on the agglomerate from the second hopper and a second pipe line to receive agglomerate from the second jet.

8. A conveying system comprising a pipe line adapted to bear fluid under pressure, a hopper for delivering material to said pipe line, a slidable valve between said hopper and said pipe line, and an ejector nozzle in said pipe line movable to block the pipe line except for the nozzle opening to subject the agglomerate within said pipe to a jet derived from the pressure in the pipe line.

9. In a system for conveying agglomerate, a pipe line adapted to have a flow of water therein, devices positioned at a plurality of places along said pipe line, hoppers for delivering material to each of said devices for conveyance to said pipe line, each of said devices having a nozzle mounted on a block movable to close substantially said pipe line and to concentrate said flow of water into a jet and having means for cutting off the delivery of material from its adjoining hopper and freeing the passage through said pipe line by removal of the nozzle block adjacent said adjoining hopper to permit the forcing of material from others of said hoppers through said pipe line.

AUGUST ZÖBELEIN.